United States Patent [19]
Nagata et al.

[11] Patent Number: 5,486,054
[45] Date of Patent: Jan. 23, 1996

[54] BEARING SYSTEM IN A MOTOR FOR A FLOPPY DISK DRIVE APPARATUS

[75] Inventors: Toshihiko Nagata, Ogasa; Hiroshi Sano, Iwata; Takayuki Yamawaki, Kakegawa; Kunitake Matsushita, Toyohashi, all of Japan

[73] Assignee: Minebea Co., Ltd., Kitasaku, Japan

[21] Appl. No.: 304,545

[22] Filed: Sep. 12, 1994

[51] Int. Cl.$^6$ .................................................. F16C 19/10
[52] U.S. Cl. ........................................ 384/610; 384/420
[58] Field of Search ................................ 384/610, 425, 384/223, 243, 420

[56] References Cited

U.S. PATENT DOCUMENTS

| | | | |
|---|---|---|---|
| 3,161,447 | 12/1964 | Larsson | 384/425 |
| 4,618,273 | 10/1986 | Götz et al. | 384/610 X |
| 4,792,245 | 12/1988 | Fuke et al. | 384/610 |

FOREIGN PATENT DOCUMENTS

| | | | |
|---|---|---|---|
| 131515 | 5/1992 | Japan | 384/610 |
| 223120 | 8/1993 | Japan | 384/610 |

*Primary Examiner*—Thomas R. Hannon
*Attorney, Agent, or Firm*—Staas & Halsey

[57] ABSTRACT

A bearing system in a motor for a floppy disk drive (FDD) apparatus includes a protective cap mounted to one side of the motor, a first pivot bearing arranged movable to and from the protective cap in an axial direction of a rotary shaft, a thrust spring provided for urging the first pivot bearing in the axial direction of the rotary shaft, the rotary shaft having a rotor fixedly mounted thereto and rotatably supported at one end by the first pivot bearing and at the other end by a second pivot bearing mounted to a base for installation of the motor, and an alignment bushing arranged through which the rotary shaft of the motor extends without direct contact and closely fitted into a positioning hole provided in a plate to which the motor is secured. The rotary shaft remains not in direct contact with (spaced apart from) the alignment bushing and, acting as a leadscrew, can thus rotate at a higher accuracy, eliminating intrinsic drawbacks of the FDD motor. In rotation, a thrust is exerted across the first pivot bearing in the motor to the rotary shaft and such wearing properties as between the thrust spring and the ball in the conventional system needs not to be accounted for. Also, the thrust will be lessened by a combination of the base portion of the first pivot bearing and the protective cap which both are made of low-cost synthetic resin.

3 Claims, 2 Drawing Sheets

BEARING SYSTEM IN A MOTOR FOR A FLOPPY DISK DRIVE APPARATUS

BACKGROUND OF THE INVENTION

1. Field of the Invention

The present invention relates to a bearing system in a motor for a floppy disk drive apparatus (referred to as FDD hereinafter).

2. Description of the Prior Art

FDD apparatus are relatively simple for handling where floppy disks can readily be loaded and unloaded, and have widely been used as external memory devices in computers. As up-to-date computers have been down-sized, the FDD apparatuses are required to decrease their overall dimensions, particularly in microcomputers. Dimensionally decreased FDD apparatuses are substantially provided with small-sized motors for driving FDD units and magnetic heads.

The motor for driving a magnetic head has to operate at a given degree of accuracy even if its size is minimized. FIG. 3 is a cross sectional view showing a primary part of such a conventional motor as designed for satisfying the above dimensional requirement. Denoted by 51 in FIG. 3 is a side plate of an FDD apparatus. A PM type pulse motor 52 is fixedly mounted to the FDD side plate 51 for driving an unshown magnetic head carriage. More specifically, a mounting plate 53 of the pulse motor 52 is tightened by screws 54 to the FDD side plate 51. The pulse motor 52 has a stator 55 and a rotor 56 with permanent magnets mounted on the inner side of the stator 55 for rotation. The construction of the PM type pulse motor 52 is well known and will be explained in no more details, except in connection with a bearing structure.

The rotor 56 is mounted to a rotary shaft 57 which extends to the outside of the pulse motor 52 having a lead-screw portion 58 thereof for movement of the magnetic head carriage. The stator 55 of the PM type pulse motor 52 has a protective cap 59 of a metal sheet provided at one end thereof. A thrust spring 60 of a leaf type is sandwiched between the stator 55 and the protective cap 59 for urging the rotary shaft 57 in the thrust direction. The rotary shaft 57 is rotatably supported at one end by a ball 61 disposed at the distal end of the thrust spring 60. There is a sintered metal bearing 62 mounted to the mounting plate 53 on the side wall 51 in order to rotatably support an intermediate portion of the rotary shaft 57. The rotary shaft 57 is also supported at the other end by a ball 64 seated on a pivot bearing 63 which is fixedly mounted to a bottom plate (not shown) of the FDD apparatus. The ball 61 is coated with a later of wear-protective grease.

In such a conventional bearing system in an FDD motor as explained above, the rotary shaft 57 is substantially supported by the sintered metal bearing 62 and the pivot bearing 63. Hence, the rotational accuracy of the rotary shaft 57 is determined by a combination of the surface quality of the FDD bottom plate and the installation precision of the pivot bearing 63 on the bottom plate, and the surface quality of the mounting plate 53 of the PM type pulse motor 52 and the installation precision of the sintered metal bearing 62 on the mounting plate 53. The combination may thus affect the operational accuracy of the leadscrew portion 58 of the rotary shaft 57, causing write and read actions of the FDD apparatus to be unstable.

SUMMARY OF THE INVENTION

It is an object of the present invention to eliminate the foregoing disadvantage and to provide an improved bearing system in a motor for an FDD which is simple in construction and maintains a high rotational accuracy of a rotary shaft for optimizing write and read actions of the FDD apparatus.

To achieve the above and other objects of the present invention, a bearing system in a motor for an FDD in which a rotary shaft extends to the outside for acting as a leadscrew includes: a protective cap mounted to one side of the motor; a first pivot bearing arranged movable to and from the protective cap in the axial direction of the rotary shaft; a thrust spring provided for urging the first pivot bearing in the axial direction of the rotary shaft; the rotary shaft having a rotor fixedly mounted thereto and rotatably supported at one end by the first pivot bearing and at the other end by a second pivot bearing mounted to a base for installation of the motor; and an alignment bushing arranged through which the rotary shaft of the motor extends without direct contact and closely fitted into a positioning hole provided in a plate to which the motor is secured.

The rotary shaft remains in no direct contact with the alignment bushing and thus its leadscrew is increased in the rotating accuracy, whereby the conventional disadvantage for an FDD is eliminated. In movement, a thrust is exerted across the first pivot bearing in the motor to the rotary shaft and such wearing properties as between the thrust spring and the ball in the conventional system needs not be accounted for. Also, the thrust will be lessened by a combination of the base portion of the pivot bearing and the protective cap, both of which which are made of low-cost synthetic resin.

As set forth above, the bearing system of the prevent invention includes: a protective cap mounted to one side of the motor; a first pivot bearing arranged movable to and from the protective cap in the axial direction of a rotary shaft; a thrust spring provided for urging the first pivot bearing in the axial direction of the rotary shaft; the rotary shaft having a rotor fixedly mounted thereto and rotatably supported at one end by the first pivot bearing and at the other end by a second pivot bearing mounted to a base for installation of the motor; and an alignment bushing arranged through which the rotary shaft of the motor extends without direct contact and closely fitted into a positioning hole provided in a plate to which the motor is secured.

Accordingly, the bearing system of the present invention is rather simple in the construction as compared with the conventional bearing system. The rotary shaft remains not in direct contact with (spaced apart from) the alignment bushing and its rotating movement is not disturbed by unwanted friction. Thus, the leadscrew of the rotary shaft can rotate at a higher accuracy while the second pivot bearing is precision mounted to the bottom plate of the FDD apparatus, thereby eliminating intrinsic drawbacks of the FDD motor. In action, a thrust is exerted across the first pivot bearing in the motor to the rotary shaft and such wearing properties as between the thrust spring and the ball in the conventional system needs not be accounted for. Also, the thrust will be lessened by a combination of the base portion of the pivot bearing and the protective cap, both of which both are made of low-cost synthetic resin.

DESCRIPTION OF THE PREFERRED EMBODIMENTS

Figure 1:
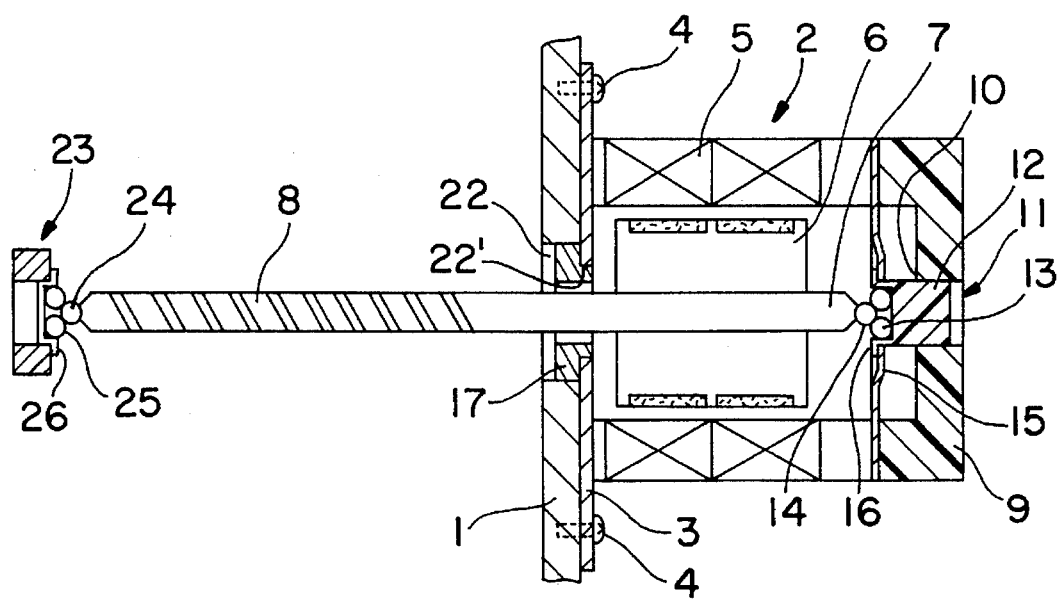
FIG. 1 is a cross sectional view showing one embodiment of the present invention.

One embodiment of the present invention will now be described referring to the accompanying drawings. FIG. 1 is a cross sectional view of a bearing system for an FDD motor according to the present invention. As shown, a side plate of an FDD apparatus is denoted by 1. A PM type pulse motor 2 is fixedly mounted to the FDD side plate 1 for driving an unshown magnetic head carriage. More specifically, a mounting plate 3 of the pulse motor 2 is tightened by screws 4 to the FDD side plate 1. The pulse motor 2 has a stator 5 and a rotor 6 with permanent magnets mounted on the inner side of the stator 5 for rotation. The construction of the PM type pulse motor 2 is well known and will be explained in no more details, except in connection with a bearing system.

Figure 2:
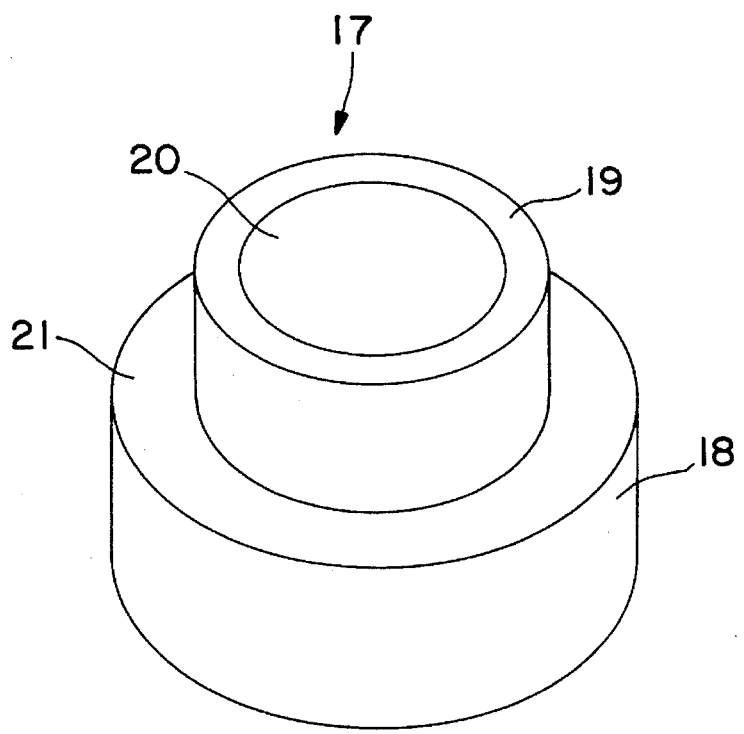
FIG. 2 is a perspective view of an alignment bushing of the embodiment one shown in FIG. 1.
Figure 3:
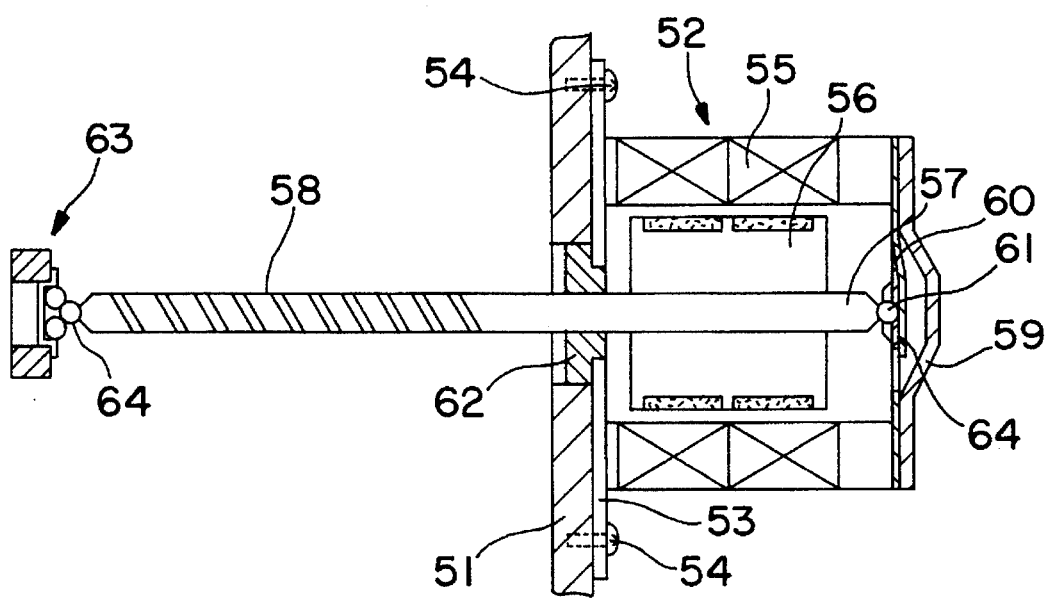
FIG. 3 is a cross sectional view of a conventional PM type pulse motor.

The rotor 6 is fixedly mounted to a rotaty shaft 7 which extends to the outside of the pulse motor 2 having a leadscrew portion 8 thereof for movement of the magnetic head carriage. The stator 5 of the PM type pulse motor 2 is provided at one end with a protective cap 9 fabricated by molding synthetic resin to a shape. The protective cap 9 has a through opening 10 arranged in the center thereof and into which a base 12 of pivot bearing 11 is fitted for sliding in the thrust direction of the rotary shaft 7. The pivot bearing 11 contains balls 13 which support the rotary shaft 7 by a ball 14. There is a thrust spring 15 of a leaf type sandwiched between the stator 5 and the protective cap 9 for urging the pivot bearing 11 in the thrust direction. The distal end of the thrust spring 15 is engaged with a flange 16 of the base 12 of the pivot bearing 11. Denoted by 17 is a metal alignment bushing for alignment of the rotary shaft 7. As best shown in FIG. 2, the alignment bushing 17 comprises a large diameter portion 18 and a small diameter portion 19 and has a through bore 20 provided in the center thereof and through which the rotary shaft 7 extends. The diameter of the bore 20 is larger than the outer diameter of the rotary shaft 7. The small diameter portion 19 of the alignment bushing 17 is fitted into a center hole 22' of the mounting plate 3 of the PM type pulse motor 2 while a shoulder of the-same comes into direct contact with the outer side of the mounting plate 3. For fastening of the bushing 17 to a precise location, the edge of the small diameter portion 19 is swagelocked to the mounting plate 3. The other end of of the rotary shaft 7 is supported by a ball 24 which is seated on a pivot bearing 23 mounted to a bottom plate (not shown) of the FDD apparatus. The pivot bearing 23 contains balls 25 arranged on a support disk 26.

The action of the embodiment of the present invention will be explained. As shown in FIG. 1, the pivot shaft 7 having the leadscrew portion 8 is supported at both ends by the two pivot bearings 11 and 23 while it is not sustained at any intermediate point. For mounting the PM type pulse motor 2 to the FDD side plate 1, the large diameter portion 18 of the alignment bushing 17, coupled with precision to the PM type pulse motor 2, is fitted into the mounting hole 22 of the FDD side plate 1. As the rotary shaft 7 of the motor remains not in contact with (spaced apart from) the alignment bushing 17, it rotates without any undesired friction, supported by the pivot bearing 23 mounted with precision to the FDD bottom plate. As the result, the leadscrew portion 8 of the rotary shaft 7 is increased in the rotational accuracy and the disadvantage attributed to the conventional bearing system of an FDD is eliminated.

During the action, a load in the thrust direction is applied across the pivot bearing 11 to the rotary shaft 7 of the PM type pulse motor 2 and it is not needed to account for such physical wearing properties as between the thrust spring and the ball in the conventional system. Also, the base 12 of the pivot bearing 11 and the protective cap 9 are made by molding synthetic resin into shapes at low cost without trading off their functional capability.

What is claimed is:

1. A bearing system in a motor for a floppy disk drive apparatus in which a rotary shaft, having a rotor fixedly mounted thereto, extends to an outside portion of the motor to act as a leadscrew, the bearing system comprising:

a protective cap mounted to one side of the motor;

a first pivot bearing arranged movable to and from the protective cap in an axial direction of the rotary shaft;

a second pivot bearing mounted to a base for installation of the motor;

a plate to which the motor is secured;

a thrust spring to urge the first pivot bearing in the axial direction of the rotary shaft;

the rotary shaft being rotatably supported at one end by the first pivot bearing and at the other end by the second pivot bearing; and an alignment bushing arranged through which the rotary shaft of the motor extends without direct contact and closely fitted into a positioning hole provided in the plate to which the motor is secured.

2. A bearing system in a motor for a floppy disk drive apparatus according to claim 1, wherein the protective cap is made by molding synthetic resin into a shape.

3. A bearing system in a motor for a floppy disk drive apparatus according to claim 1, wherein the first pivot bearing is made by molding synthetic resin into a shape.

* * * * *

UNITED STATES PATENT AND TRADEMARK OFFICE
CERTIFICATE OF CORRECTION

PATENT NO. : 5,486,054
DATED : January 23, 1996
INVENTOR(S) : Toshihiko NAGATA, et al.

It is certified that error appears in the above-indentified patent and that said Letters Patent is hereby corrected as shown below:

Column 1, line 49, change "later" to --layer--.

Column 2, line 29, delete "which"; and line 65, change "embodiment one" to --one emodiment--.

Signed and Sealed this

Twenty-eighth Day of May, 1996

Attest:

BRUCE LEHMAN

*Attesting Officer*     *Commissioner of Patents and Trademarks*